United States Patent

Mattner et al.

[11] Patent Number: 5,816,760
[45] Date of Patent: Oct. 6, 1998

[54] UNDER CUTTING ANCHOR

[75] Inventors: Richard Mattner, Dornbirn; Erich Wisser, Bregenz; Manfred Hartmann, Frastanz, all of Austria; Helmut Gassner, Triesenberg, Liechtenstein; Susanne Kossian, Feldkirch, Austria; Jakob Kunz, Buchs, Switzerland; Rainer Kussmaul, Thüringen; Hermann Beck, Feldkirch-Tisis, both of Austria

[73] Assignee: Hilti Aktiengesellschaft, Schaan, Liechtenstein

[21] Appl. No.: 822,553

[22] Filed: Mar. 19, 1997

[30] Foreign Application Priority Data

Jun. 5, 1996 [DE] Germany ............ 196 22 544.2

[51] Int. Cl.⁶ ............ F16B 13/04; F16B 13/06
[52] U.S. Cl. ............ 411/30; 411/31; 411/55; 411/49; 411/52
[58] Field of Search ............ 411/29, 30, 31, 411/49–53, 54, 55, 57, 60, 544

[56] References Cited

U.S. PATENT DOCUMENTS

| 948,938 | 2/1910 | Skidmore | 411/55 |
|---|---|---|---|
| 1,503,515 | 8/1924 | Phillips | 411/53 |
| 4,575,294 | 3/1986 | Mermi | 411/30 |
| 4,692,076 | 9/1987 | Herb | 411/55 |
| 4,702,654 | 10/1987 | Frischmann | 411/31 |
| 4,797,044 | 1/1989 | Velasco | 411/55 |
| 4,929,134 | 5/1990 | Bergner | 411/30 |
| 5,112,178 | 5/1992 | Overhues | 411/544 |

Primary Examiner—Flemming Saether
Attorney, Agent, or Firm—Anderson, Kill & Olick, P.C.

[57] ABSTRACT

A spreading anchor (1) including an anchor rod (2) provided at its front end, when viewed in a setting direction, with a head (3, 30) having at least several regions, which taper outwardly in the setting direction, and extending through an axial through-bore of an expansion sleeve(5) axially displaceable along the anchor rod (2, 20) and having a plurality of axial longitudinal slots (7) extending from a front end of the expansion sleeve (2, 20) and forming at least two, located opposite each other expansion tabs (6) provided at their free front ends with cutters (16), the spreading anchor (1) being supported against an upper surface of a ground (G) and further including rotation-transmitting driver elements for transmitting axial rotation, which is generated during setting of the anchor rod (2, 20), to the expansion sleeve (5).

9 Claims, 3 Drawing Sheets

UNDER CUTTING ANCHOR

BACKGROUND OF THE INVENTION

1. Field of the Invention

The present invention relates to a spreading anchor and, in particular, to a spreading anchor which, during a setting process, forms an undercut in the receiving bore of a ground and which includes an anchor rod provided at its front end, when viewed in a setting direction, with a head having at least several regions, which taper outwardly in the setting direction, and extending through an axial through-bore of an expansion sleeve axially displaceable along the anchor rod and having a plurality of axial longitudinal slots extending from a front end of the expansion sleeve and forming at least two, located opposite each other, expansion tabs provided at their free front ends with cutters.

2. Description of the Prior Art

In anchoring technology, it is often necessary to form connections which are expansion pressure-free to the greatest possible extent. In particular, with small edge and axis distances, the anchoring with conventional expansion dowels can result in fracture or even in stratification of the subsoil or the ground. To prevent this, there are provided anchoring systems in which a special connection or anchoring element is form-lockingly anchored in a receiving bore. To this end, a cylindrical receiving bore is provided at a predetermined depth with an undercut. An anchoring element, which is inserted in the pre-formed bore, includes an anchor rod provided with a cone and extending through an axial through-bore of a sleeve. The sleeve is provided with expanding segments which are swung out as a result of a relative movement of the sleeve and the anchor rod.

For forming the undercut in the cylindrical bore, a special tool is required. The undercut formed with such a tool is often not optimally matched with the connecting spreading anchor. As a result, the form-locking connection which is formed by the expanding element of the spreading anchor sleeve with the undercut is also often not optimal and need be improved.

To eliminate this drawback, e.g., U.S. Pat. No. 4,702,654 proposes to form the undercut directly with the insertable spreading anchor. To this end, the spreadable expansion tabs of the sleeve are provided with cutters. The expansion sleeve is provided at its opposite rear end with recesses in which driver claws of a setting tool can engage. The setting tool is connected to the anchor rod. The setting tool can provide for rotation of the sleeve. During its rotation, the expansion tabs are displaced against and over an anchor rod cone which is supported on the bore bottom. Thereby, the spread expansion tabs are pressed against the bore wall. As a result of rotation of the expansion sleeve, the cutters provided on the expansion tabs form an undercut. The shape of a so-produced undercut closely corresponds to the shape of the expansion tabs. The cylindrical receiving bore should be bored to a precisely pre-determined depth as the cone-shaped head provided at the front end of the anchor rod should be supported on the bore bottom. During the setting process, with a stationary anchor rod and a rotating sleeve, an increased friction can occur which complicates the setting process. The angle, which is formed by the spread expansion tabs of this known anchor with the axis of the anchor rod, is relatively small and is only about 23°. As a result, the load, applied to the set anchor, has a relatively large horizontal force component which may lead to an excessive loading of the ground under an application of an expansion pressure. For forming the undercut, a special tool is needed.

Furthermore, with the inserted anchor, it cannot be seen whether the undercut is sufficiently large and/or whether the expansion tabs penetrated in the undercut sufficiently far.

Accordingly, an object of the present invention is to provide a spreading anchor which can be simply and reliably set in. The spreading anchor should automatically form an undercut during the settling process. Additional auxiliary means should be eliminated to the greatest possible extent. The spreading anchor should be capable of being set and anchored independently of the depth of the pre-drilled cylindrical receiving bore. It should be possible to produce the undercuts with a larger undercut angle which the spreading of the expansion tabs should be able to increase. At that, it should be possible to form a spreading anchor such that with a set anchor, it becomes immediately clear if a sufficiently large undercut or a form-locking connection of the expansion tabs with the ground is achieved.

SUMMARY OF THE INVENTION

These objects are achieved by providing a spreading anchor of the above-described type which is supported on the ground and includes rotation-transmitting driver means for transmitting axial rotation, which is generated during setting of the anchor rod, to the expansion sleeve. A spreading anchor according to the present invention includes an anchor rod provided at its front end, when viewed in a setting direction, with a head having at least several regions, which taper outwardly in the setting direction, and extending through an axial through-bore of an expansion sleeve axially displaceable along the anchor rod. The sleeve has a plurality of axial longitudinal slots extending from a front end of the expansion sleeve and forming at least two, located opposite each other, expansion tabs provided at free front ends thereof with cutters. The spreading anchor is supported against an upper surface of the ground and further includes rotation-transmitting driver means for transmitting the rotation, which is generated during setting of the anchor rod, to the expansion sleeve.

The spreading anchor is supported against an upper surface of the ground in which the cylindrical receiving bore is formed. The tapering head need not be supported on the bore bottom any more in order to form the undercut. Only a minimal bore depth of the cylindrical receiving bore must be insured in order to completely insert the spreading anchor. With the spreading anchor according to the present invention, for setting the anchor, the anchor rod is rotated, and there is provided rotation-transmitting means for transmitting the rotational movement of the anchor rod to the expansion sleeve. The anchor rod and the expansion sleeve rotate synchronously. Thereby, no adverse friction occurs between the anchor rod and the expansion sleeve which otherwise would have complicated the setting process. Because the anchor rod and the expansion sleeve are jointly rotated, the conical head region of the front end of the anchor rod is so formed that it supports the expansion tabs during their expansion. As a result, expansion tabs can spread to a greater extent and can form a wider undercut with a larger undercut angle. This increases the angle between the spread expansion tabs and the anchor rod axis. Thereby, upon application of an axial tensile load to the set anchor, the horizontal force component, which is responsible for the expansion pressure can be kept small.

In a preferred embodiment of the present invention, the rotation-transmitting driver means is formed as radial driver studs which extend from the head in the connection region of the head with the anchor rod and which engage in the longitudinal slots of the expansion sleeve for joint rotation therewith. The studs are already engaged in the longitudinal slots of the expansion sleeve at the beginning of the setting process and transmit the rotational movement of the anchor rod to the expansion sleeve. The more expand the expansion tabs the further is the expansion sleeve pushed over the conical section of the head. As a result, the driver studs further penetrate into the longitudinal slots. The transmitting surfaces between the driver studs and the expansion sleeve increase with progressive expansion of the expansion tabs. Thereby, the increase in the frictional force between the expansion tabs and the bore wall does not result in breaking of the driver studs.

Because the profile of the axial projection of the driver studs substantially corresponds to the profile of the axial projection of the longitudinal slots, the driver studs can easily slide into the longitudinal slots, without much resistance, during the relative axial movement between the anchor rod and the expansion sleeve.

It is advantageous for the transmission of the rotational movement of the anchor rod to the expansion sleeve when the driver studs have a wedge-shaped widening profile from the circumference of the anchor rod to the head circumference. Thereby the driver studs remain, even with expanding expansion tabs, in a surface contact with the side surfaces of the expansion sleeve to the most possible extent, and the expansion tabs are, in addition to being axially supported, are displaced laterally. In this way, radial deformation of the expansion tabs by forces, which are generated during the formation of the undercut by shaving the ground, is prevented.

A particularly reliable support of the expansion tabs takes place when the regions of the head between the driver studs are formed as sections of cylindrical surfaces onto which the expansion sleeve with expandable expansion tabs is pushed.

In an advantageous embodiment of the present invention, the rotation-transmitting driver means is formed by a rotation-transmitting connection of the anchor rod and the expansion sleeve whereby the anchor rod has at least in a front region thereof a cross-section which deviates from a circular cross-section, and the through-bore of the expansion sleeve has a cross-section calibrated in accordance with the cross-section of the anchor rod.

In this way, at least a portion of the longitudinal extent of the expansion sleeve has a relatively large rotation-transmitting surfaces which are available along its entire circumference already at the beginning of the setting process or the undercutting process.

Advantageously, the anchor rod has a polygonal cross-section, and the head has a plurality of wedge surfaces which are inclined outwardly from the anchor rod axis in the setting direction, and the number of the wedge surfaces correspond to the number of the expansion tabs of the expansion sleeve. The wedge surfaces of the head support the expansion tabs and absorb a larger portion of the forces which are generated during the formation of the undercut. Thereby the danger of shearing-off of the expansion tabs is noticeably reduced. The largest possible surface contact between the expansion tabs and the wedge surfaces permits to expand the expansion tab to a greater degree to form a deeper undercut with a larger undercut angle.

In an advantageous embodiment of the invention, a push sleeve, which is connected with the expansion sleeve and is displaced along the anchor rod, provides for support of the spreading anchor on the upper surface of the ground. The push sleeve extends up to the rear end of the anchor rod and has its front end releasably connected with a rear end of the expansion sleeve. At its rear end, the push sleeve has a spring washer-shaped arcuate flange, the convexity of which is such that the concave side of the flange faces the front end of the push sleeve. The opposite side of the flange is engaged by a clamp nut which is screwed on, preferably, a right-hand, outer thread provided on the rear end of the anchor rod. The spring washer-shaped flange provides for a visual control of the set anchor. The displacement path of the expansion sleeve corresponds to the curvature of the spring washer-shaped flange. The push sleeve transmits the axial displacement to the expansion sleeve which is displaced over the conical head a corresponding amount, whereby the expansion tabs expand and form an undercut in the receiving bore by shaving the ground. The setting process ends when the spring washer-shaped flange flatly abuts the ground. The spring washer-shaped flange can compensate unevenness of the upper surface of the ground or not exactly perpendicular position of the spreading anchor resulting from a small skewing of the receiving bore in the ground.

Very advantageous pull-off values and small expansion pressure are obtained when the surfaces of the expansion tabs, which contact the bore wall, form with the anchor rod, in a completely expanded condition of the expansion tabs, an angle from about 60° to about 80° and, preferably, of about 70°.

Anchoring of a spreading anchor with an automatic formation of an undercut and which include an expansion sleeve, a push sleeve and a clamp nut, in a cylindrical receiving bore is effected in a simple manner and does not require any special auxiliary tools. The anchoring process includes the following steps: the spreading anchor is inserted in a preliminary formed cylindrical receiving bore in the ground, the anchor rod is connected for joint rotation to a rotational drive unit, preferably a hand-held power unit and the anchor rod is rotated in a counter-clock wise direction until the clamp nut presses the spring washer-shaped flange of the push sleeve flatly against the ground. Thereafter, the drive unit is disconnected from the anchor rod.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
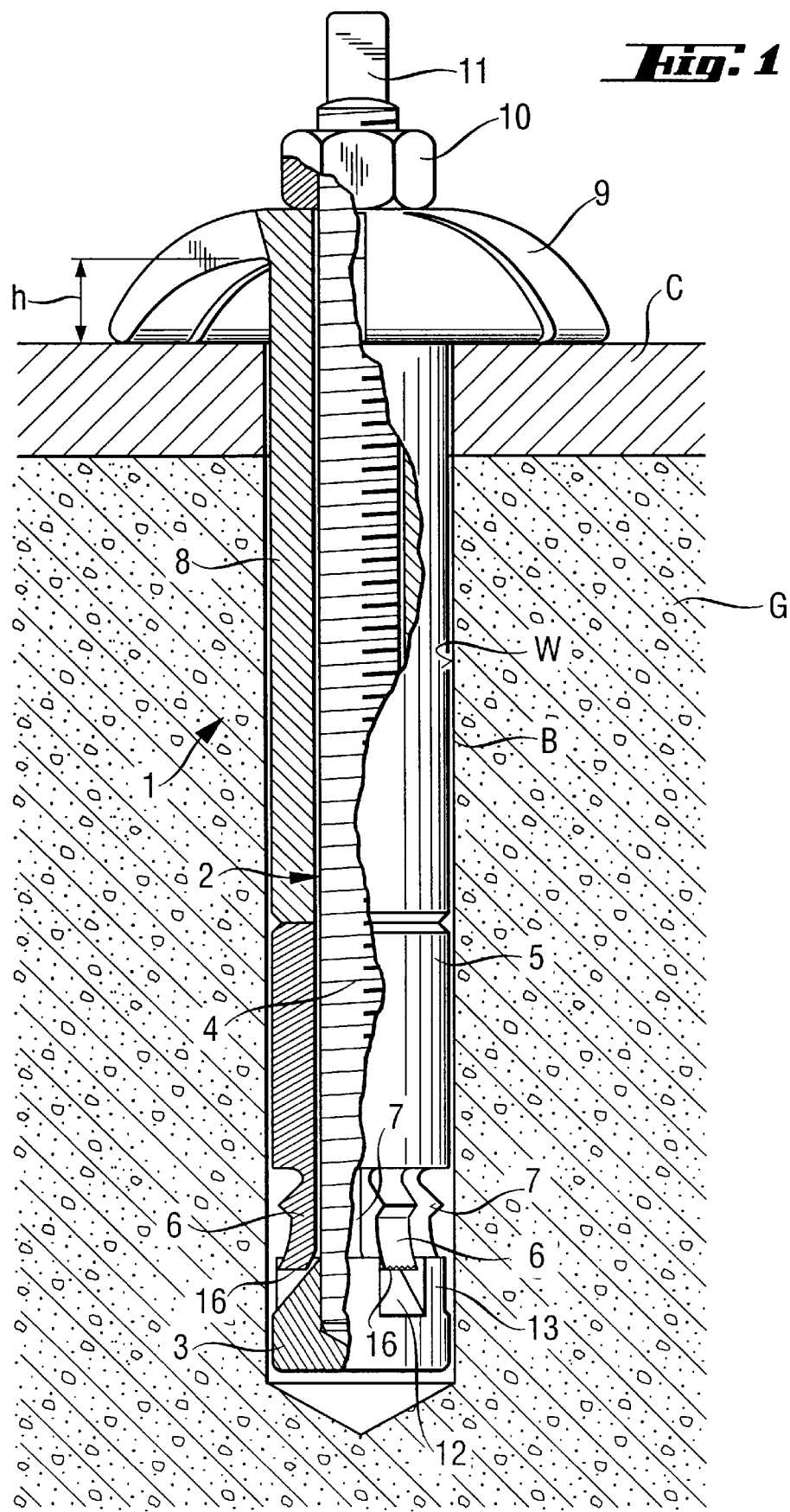
FIG. 1 is a partially cross-sectional view of a spreading anchor according to the present invention and extending into a receiving bore in an unanchored position of the anchor.

FIG. 1 shows a partially cross-sectional view of an embodiment of a spreading anchor according to the present invention in which the spreading anchor is designated with a reference numeral 1. The spreading anchor 1 is inserted in a cylindrical receiving bore B formed in ground G and firmly abuts a constructional element C. The anchor 1 has an anchor rod 2 provided, e.g., as shown in the drawings, with an outer thread 4 along its entire longitudinal extent. The anchor rod 2 is connected, at its front end, when viewed in the setting direction, with a head 3 which at least in some regions has a conical shape. The anchor rod through-s through an axial through-bore of an expansion sleeve 5 axially displaceable relative to the anchor rod 2. The expansion sleeve 5 has a plurality of longitudinal slots 7 which extend from the front end of the expansion sleeve 5 and separate a plurality of expansion tabs 6 from each other. The expansion tabs 6 have each, at their free front ends, a plurality of cutting edges or cutters 16 which are preferably formed by hardened regions of the expansion tabs 6. Also, there can be provided cutter sets insertable into the outer surfaces of the expansion tabs 6 and projecting therefrom. At its rear end, the expansion sleeve 5 is abutted by a push sleeve 8 displaceable along the anchor rod 2. The push sleeve 8 is detachably connected with the rear end of the expansion sleeve 5. At its opposite, rear end, the push sleeve 8 has a spring washer-shaped arcuate flange 9. At that, the concave bottom of the spring washer-shaped flange 9 is associated with the outer surface of the constructional element C. The edge of the arcuate flange 9 is supported on the constructional element C and thereby against the ground G. A clamping nut 10 holds the anchor rod 2, the expansion sleeve 5 and the push sleeve 8 together and prevents the anchor rod 2 from falling to the bottom of the receiving bore B.

Figure 2:
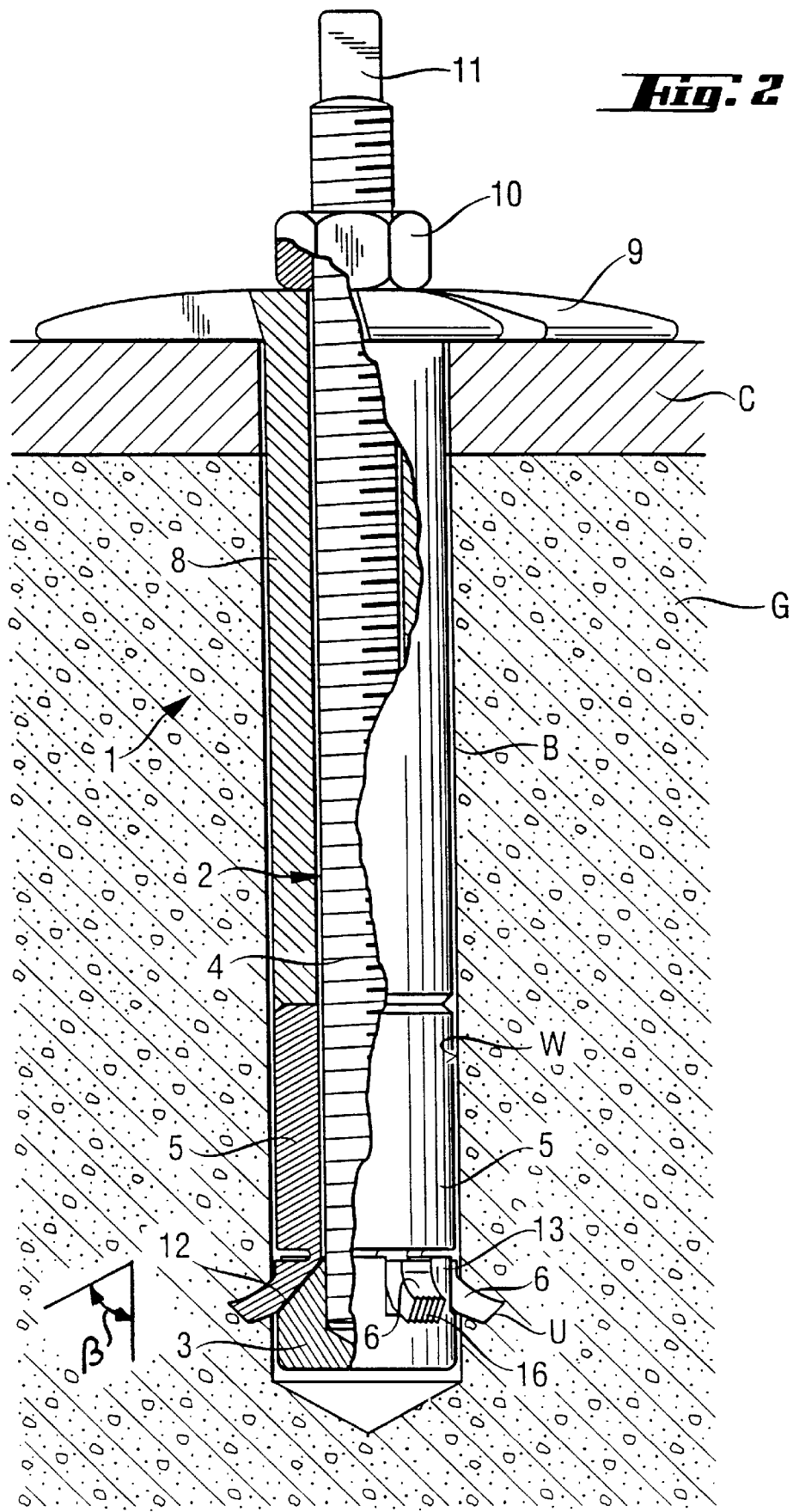
FIG. 2 is a cross-sectional view of the spreading anchor shown in FIG. 1 but in an anchored position of the anchor.

As shown in FIG. 2, the spreading anchor 1 according to the present invention automatically forms, during its anchoring, an undercut U in the cylindrical receiving bore. To this end, the expansion tabs 6, which are provided with cutting edges or cutters 16, are expanded, and the expansion sleeve is rotated about its longitudinal axis. This is effected by rotating the anchor rod 2. The anchor rod 2 has, at its rear end, an connection piece 11 for connection to an electrically driven hand-held power unit. The rotation of the anchor rod 2 in a counterclockwise direction causes the displacement of the clamping nut 10 along the anchor rod 2 in a setting direction. At that, the clamping nut 10 presses the spring washer-shaped flange 9 downward until the flange 9 lies on the constructional element C. As a result of the down displacement of the flange 9, the push sleeve 8 is pushed along the anchor rod 2 into the receiving bore B. The axial displacement path is determined by a height of the convexity of the spring washer-shaped flange 9. The push sleeve 8 displaces the expansion sleeve 5 relative to the anchor rod 2 in the direction toward the head 3 by the same amount. The head 3 has regions 12 conically expanding toward the bore bottom. The expansion tabs 6 slides along the conically expanding regions 12 and are pressed outwardly against the bore wall W. The rotation of the anchor rod 2 is transmitted to the expansion sleeve 5 during the setting process. During the rotation of the expansion sleeve 5, the cutters 16 carry the shaved bore wall materials out, and an undercut U is formed. The largest angle β, which is formed by the expansion tabs 6, which extend into the undercut U, and the anchor rod 2, is about 60°–80° and, preferably, about 70°.

Figure 3:
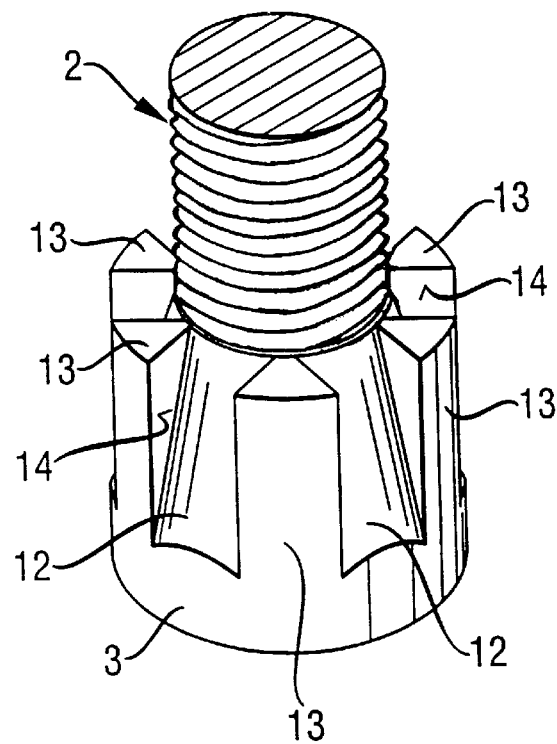
FIG. 3 is a perspective view of the head of the spreading anchor shown in FIG. 1.

As shown in FIG. 3, the head 3, which is connected with the anchor rod 2, has driver studs 13 which separate the conical regions 12 from each other. The driver studs 13 engage in the longitudinal slots 7 in the expansion sleeve 5 which separate the expansion tabs 6 from each other (FIG. 2). During the forward movement of the expansion sleeve 5, the driver studs 13 penetrate further into the longitudinal slots 7, improving the rotation-transmitting lock. The driver stud 13 have somewhat triangular cross-sections, whereby the circumference of the head 3 forms an accurate base line. At that, the driver studs 13 widen from the anchor rod 2 toward the circumference of the head 3. The substantially triangular shape of the driver studs 13 facilitate their penetration into the longitudinal slots 7 between the expansion taps. The conically widening regions 12 of the head 3 are preferably formed as cylindrical surfaces on which the expansion tabs 6 can be supported. The driver studs 13 have axial guide surface 14 for the longitudinal surfaces of the expansion tabs 6. Thereby, the expansion tabs 6 are guided laterally during the formation of the under U.

Figure 4:
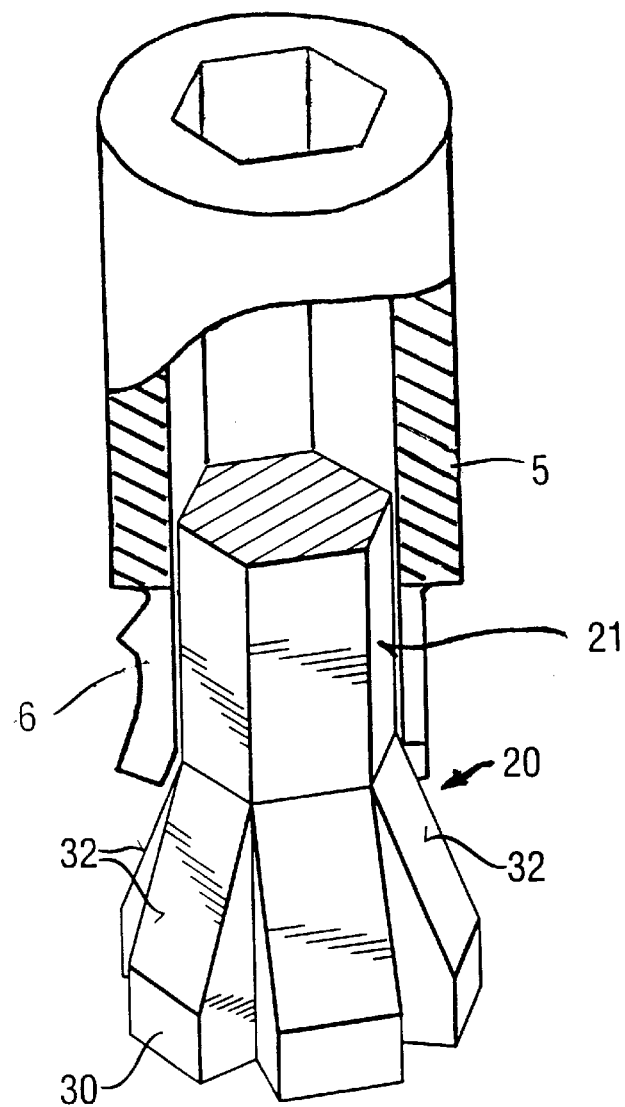
FIG. 4 is a perspective view of the head of another embodiment of a spreading anchor according to the present invention.

In an embodiment of a spreading anchor according to the present invention, which is shown in FIG. 4, a head 30 is secured at the front end of an anchor rod 20. The anchor rod 20 has, in a region of an expansion sleeve (not shown) a polygonal cross-section. The rotational connection of the anchor rod 20 with the expansion sleeve is effected, in the embodiment shown in FIG. 4, by fixedly securing the anchor rod 20 in a bore which is calibrated in accordance with the circumferential profile of the anchor rod 20. In the embodiment shown in FIG. 4, the anchor rod 20 is formed as a hexagon. It should be clear that the bore of the expansion sleeve, which is not shown, also has a hexagonal cross-section. Thereby, during the rotation of the anchor rod 20, a form-locking connection between the anchor rod 20 and the expansion sleeve is formed. The expansion of the expansion tabs is again effected by the axial displacement of the expansion sleeve along the anchor rod. At that, the head 30 is formed as a cone widening in the setting direction. The head 30 is provided with wedge surfaces 32 which correspond to side surfaces 21 of the anchor rod 20. The wedge surfaces 32 extend in a direction of an axial extension of the side surfaces 21 of the anchor rod 20. This results in that the longitudinal slots of the expansion sleeve, which is not shown, coincide with the edges of the anchor rod 20. The axial displacement of the expansion sleeve is again effected by a push sleeve with a spring washer-shaped flange. The setting process of a spreading anchor according to the present invention is finished when the spring washer-shaped flange flatly abuts the attachable constructional element. In this way, the spring washer-shaped flange provides at the same time a visual control for proper anchoring.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An undercut cutting anchor, comprising:
   an anchor rod (2,20) having at a front, when viewed in a setting direction, end thereof a head (3,30)), the head (3,30) having a plurality of regions (12) expanding conically in the setting direction;
   an expansion sleeve (5) having an axial through-bore through which the anchor rod extends, the sleeve (5) being axially displaceable along the anchor rod and having a plurality of longitudinal slots (7) extending from a front, when viewed in the setting direction, end of the expansion sleeve and forming at least two expansion tabs (6);
   cutter means (16) provided at a free end of each of the at least two expansion tabs;
   driver means for imparting rotation, which is generated during a setting process of the anchor rod, to the expansion sleeve; and means for supporting the anchor in a suspended condition within an anchor receiving bore (B) when an undercut is being formed in a wall of the receiving bore.

2. An anchor according to claim 1, wherein the rotation-imparting means comprises driver studs (13) projecting from the head (3) in a connection region of the head (3) with the anchor rod (2) and engaging into the longitudinal slots (7) of the expansion sleeve (5) to impart rotation to the expansion sleeve (5) upon rotation of the anchor rod (2).

3. An anchor according to claim 2, wherein the driver studs (13) have a cross-section corresponding to a cross-section of the longitudinal slots (7).

4. An anchor according to claim 3, wherein the driver studs (13) have a wedge-shaped cross-section which widens toward an outer circumference of the head (3).

5. An anchor according to claim 1, wherein the plurality of head regions (12) are formed as section of a cylindrical surface along which the expansion sleeve (5) is displaced with the expansion of the expansion tabs (6).

6. An anchor according to claim 1, further comprising a push sleeve (8) connected with the expansion sleeve (5) and displaceable along the anchor rod (2,20), the push sleeve (8) extending up to rear, in the setting direction, end of the anchor rod (2, 20), and the push sleeve (8) having a front end thereof releasably connected with a rear end of the expansion sleeve (5), wherein the anchor supporting means comprises a spring washer-shaped flange (9) provided at a rear end of the push sleeve (8) and having a convexity such that a concave side of the flange (9) faces the front end of the push sleeve (8), and a clamp member (10) abutting a convex side of the flange (9).

7. A spreading anchor according to claim 6, wherein the anchor rod (2,20) is provided, at least at a rear end portion thereof, with a right-hand outer thread (4), and the clamping member is a nut which is screwed on the outer thread (4).

8. A spreading anchor according to claim 1, wherein surfaces of the expansion tabs (6), form, in a completely expanded condition thereof in which the surfaces engage a wall of a receiving bore (B), an angle ($\beta$) from about 60° to about 80° with the anchor rod (2, 20).

9. A spreading anchor according to claim 8, wherein the angle ($\beta$) between the surfaces of the expansion tabs (6) and the anchor rod (2, 20) is about 70°.

* * * * *